(12) United States Patent
Oami (10) Patent No.: US 12,046,043 B2
(45) Date of Patent: *Jul. 23, 2024

(54) INFORMATION PROCESSING APPARATUS, CONTROL METHOD, AND PROGRAM

(71) Applicant: NEC Corporation, Tokyo (JP)

(72) Inventor: Ryoma Oami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,468

(22) Filed: Jul. 7, 2023

(65) Prior Publication Data

US 2023/0351757 A1 Nov. 2, 2023

Related U.S. Application Data

(63) Continuation of application No. 17/497,587, filed on Oct. 8, 2021, now Pat. No. 11,776,274, which is a
(Continued)

(51) Int. Cl.
*G06V 20/52* (2022.01)
*G06V 20/40* (2022.01)
(Continued)

(52) U.S. Cl.
CPC ............ *G06V 20/52* (2022.01); *G06V 20/40* (2022.01); *G06V 40/23* (2022.01); *G08B 21/24* (2013.01);
(Continued)

(58) Field of Classification Search
CPC ........ G06V 20/52; G06V 20/40; G06V 40/23; G06V 20/44; G06V 2201/07;
(Continued)

(56) References Cited

U.S. PATENT DOCUMENTS 9,165,361 B1 * 10/2015 Ely ........................... G06T 7/33
9,373,076 B1 * 6/2016 Appelman .......... G06F 16/9535
(Continued)

FOREIGN PATENT DOCUMENTS

AU 2006287940 B2 * 9/2009 ......... G06K 9/00718
CN 105898213 A 8/2016
(Continued)

OTHER PUBLICATIONS

International Search Report of PCT/JP2017/013187 dated Jun. 13, 2017 [PCT/ISA/210].
(Continued)

*Primary Examiner* — Mahendra R Patel
(74) *Attorney, Agent, or Firm* — Sughrue Mion, PLLC (57) ABSTRACT

An information processing apparatus (2000) detects a stationary object from video data (12). In addition, the information processing apparatus (2000) executes person detection process of detecting a person in vicinity of an object (target object) detected as the stationary object for each of a plurality of video frames (14) which includes the target object. Furthermore, the information processing apparatus (2000) executes a predetermined process by comparing results of the person detection process for each of the plurality of video frames (14).

3 Claims, 9 Drawing Sheets

Related U.S. Application Data continuation of application No. 16/498,493, filed as application No. PCT/JP2017/013187 on Mar. 30, 2017, now Pat. No. 11,164,006.

(51) Int. Cl.
*G06V 40/20* (2022.01)
*G08B 21/24* (2006.01)
*H04N 7/18* (2006.01)

(52) U.S. Cl.
CPC ............ *H04N 7/181* (2013.01); *G06V 20/44* (2022.01); *G06V 2201/07* (2022.01)

(58) Field of Classification Search
CPC .............. G06V 40/103; G08B 21/24; G08B 13/19602; G08B 13/19645; G08B 13/19608; H04N 7/181
USPC ........................................................ 382/103
See application file for complete search history.

(56) References Cited

U.S. PATENT DOCUMENTS

| | | | |
|---|---|---|---|
| 9,378,632 B2 * | 6/2016 | Venetianer ....... G08B 13/19604 |
| 9,570,113 B2 | 2/2017 | Campbell et al. |
| 9,898,677 B1 * | 2/2018 | Andelković ............. G06T 7/246 |
| 9,998,659 B2 | 6/2018 | Bassi ................... H04N 13/305 |
| 10,089,327 B2 | 10/2018 | Sweet, III ............... G06T 7/246 |
| 10,361,802 B1 * | 7/2019 | Hoffberg-Borghesani .................. G06F 3/00 |
| 10,380,431 B2 * | 8/2019 | Winter ..................... G06T 7/194 |
| 10,417,773 B2 * | 9/2019 | Yano ....................... G06T 7/248 |
| 10,949,685 B2 | 3/2021 | Petrany et al. |
| 10,974,148 B2 * | 4/2021 | Ikenoue ............... G02B 27/017 |
| 11,538,232 B2 | 12/2022 | Zhong et al. |
| 11,665,312 B1 | 5/2023 | Brandt et al. |
| 2009/0059002 A1 * | 3/2009 | Kim ................. G08B 13/19671 348/143 |
| 2009/0172756 A1 * | 7/2009 | Wheatley ........... H04N 21/4788 725/106 |
| 2010/0157089 A1 * | 6/2010 | Pakulski ................. G06T 7/248 348/222.1 |
| 2010/0205203 A1 * | 8/2010 | Anderson ........... G06F 16/7335 707/754 |
| 2011/0090358 A1 | 4/2011 | Tojo |
| 2011/0096922 A1 * | 4/2011 | Oya ....................... H04N 7/183 380/28 |
| 2011/0228984 A1 * | 9/2011 | Papke ..................... G06V 20/52 382/103 |
| 2013/0016910 A1 | 1/2013 | Murata ............... H04N 21/8583 382/195 |
| 2014/0112533 A1 * | 4/2014 | Wang ............... G08B 13/19608 382/103 |
| 2014/0205148 A1 * | 7/2014 | Hirano ................. G06F 16/786 382/103 |
| 2015/0179219 A1 * | 6/2015 | Gao ....................... G06V 10/24 386/278 |
| 2015/0254871 A1 * | 9/2015 | MacMillan .......... H04N 21/233 382/180 |
| 2016/0005435 A1 * | 1/2016 | Campbell ............. H04N 9/8211 386/240 |
| 2018/0115788 A1 * | 4/2018 | Burns .................... G06V 20/41 |
| 2019/0022492 A1 * | 1/2019 | Takahashi .............. G06F 17/18 |
| 2019/0205694 A1 | 7/2019 | Wang et al. |
| 2019/0213420 A1 | 7/2019 | Karyodisa et al. |
| 2019/0304105 A1 | 10/2019 | Gao et al. |
| 2020/0314458 A1 | 10/2020 | Pinel et al. |
| 2020/0327682 A1 | 10/2020 | Nater et al. |

FOREIGN PATENT DOCUMENTS

| | | | | |
|---|---|---|---|---|
| CN | 106504270 B | * | 12/2019 | ............... G06K 9/00 |
| EP | 3379471 A1 | | 9/2018 | |
| GB | 2560477 A | * | 9/2018 | ......... G06K 9/00771 |
| JP | 2002-157664 A | | 5/2002 | |
| JP | 3567066 B2 | * | 9/2004 | ....... G08B 13/19602 |
| JP | 3802737 B2 | | 7/2006 | |
| JP | 4031184 B2 | * | 1/2008 | ............... G06T 7/20 |
| JP | 4045768 B2 | | 2/2008 | |
| JP | 4281338 B2 | | 6/2009 | |
| JP | 2010-187124 A | | 8/2010 | |
| JP | 2010244089 A | * | 10/2010 | |
| JP | 2010-258704 A | | 11/2010 | |
| JP | 2011-049646 A | | 3/2011 | |
| JP | 2011-087253 A | | 4/2011 | |
| JP | 2011087253 A | | 4/2011 | ........... G06K 9/0074 |
| JP | 2011-091705 A | | 5/2011 | |
| JP | 2011-197937 A | | 10/2011 | |
| JP | 2011197937 A | * | 10/2011 | |
| JP | 2012-222685 A | | 11/2012 | |
| JP | 2012-235300 A | | 11/2012 | |
| JP | 2013-021551 A | | 1/2013 | |
| JP | 2014-086797 A | | 5/2014 | |
| JP | 2015-162185 A | | 9/2015 | |
| JP | 2015162185 A | | 9/2015 | |
| JP | 6465600 B2 | * | 2/2019 | ........... G01S 3/7864 |
| TW | 200926820 A | * | 6/2009 | ........... G06K 9/00771 |
| WO | WO-2006097357 A1 | * | 9/2006 | ......... A63B 24/0021 |
| WO | WO-2015025705 A1 | * | 2/2015 | ......... G06F 17/3079 |
| WO | 2015159689 A1 | | 10/2015 | |
| WO | 2016136144 A1 | | 9/2016 | |
| WO | 2016175075 A1 | | 11/2016 | |
| WO | 2017026356 A1 | | 2/2017 | |
| WO | 2017130252 A1 | | 8/2017 | |
| WO | 2018198373 A1 | | 11/2018 | |
| WO | 2019198452 A1 | | 10/2019 | |
| WO | 2020178926 A1 | | 9/2020 | |
| WO | 2021015960 A1 | | 1/2021 | |

OTHER PUBLICATIONS

Decision to Grant a Patent dated Aug. 31, 2021 by the Japanese Patent Office in Japanese Application No. 2020-114651.

Japanese Decision to Grant for JP Application No. 2020-114651 mailed on Aug. 31, 2021 with English Translation.

JP Office Action for JP Application No. 2021-172910, mailed on Aug. 30, 2022 with English Translation.

Japanese Office Action for JP Application No. 2021-172910 mailed on Feb. 21, 2023 with English Translation.

JP Office Communication for JP Application No. 2021-172910, mailed on Aug. 8, 2023 with English Translation.

Notice of Allowance issued Mar. 21, 2024 in U.S. Appl. No. 18/240,686.

* cited by examiner

INFORMATION PROCESSING APPARATUS, CONTROL METHOD, AND PROGRAM

CROSS REFERENCE TO RELATED APPLICATIONS

This application is a continuation of U.S. application Ser. No. 17/497,587 filed on Oct. 8, 2021, which is a continuation of U.S. application Ser. No. 16/498,493 filed on Sep. 27, 2019, which issued as U.S. Pat. No. 11,164,006, which is a National Stage of International Application No. PCT/JP2017/013187, filed on Mar. 30, 2017, the contents of which are incorporated hereinto by reference.

TECHNICAL FIELD

The present invention relates to an information processing apparatus, a control method, and a program.

BACKGROUND ART

A technology for analyzing an image captured by a surveillance camera to detect a suspicious object is being developed. For example, Patent Document 1 and Patent Document 2 disclose technologies for detecting an object whose state is continuously stationary as a suspicious left object, and presuming a person who left the object.

RELATED DOCUMENT

Patent Document

[Patent Document 1] Japanese Patent Application Publication No. 2011-049646
[Patent Document 2] Japanese Patent Application Publication No. 2012-235300

SUMMARY OF THE INVENTION

Technical Problem

In Patent Document 1 and Patent Document 2 described above, an object being continuously stationary is detected as a left object. However, the object being continuously stationary is not necessarily a left object. For example, there is a case where a customer waiting for a target plane in the lobby of the airport keeps sitting on a chair in a state of placing luggage in their vicinity. In a case where the object being continuously stationary is detected as a left object, this kind of luggage is also falsely detected as a left object.

In addition, in Patent Document 1, there is disclosed a technology in which an object being in vicinity of a moving object is not detected as a left object, so that the object which is merely left on a side of the moving object is not detected as a suspicious object. However, in this method, if the owner of the luggage does not move, such as a case where the owner keeps sitting on the chair with the luggage that is put beside their feet as described above, the luggage is falsely detected as a left object.

The present invention is made in view of the above circumstances. An object of the present invention is to provide a technology for accurately detecting a left object from a video.

Solution to Problem

An information processing apparatus of the present invention includes: 1) a stationary object detection unit that detects a stationary object from video data; 2) a person detection unit that executes person detection process of detecting a person in vicinity of a target object for each of a first video frame and a second video frame, the target object being an object detected as the stationary object, the first video frame including the target object, the second video frame including the target object and being generated after the first video frame; and 3) a process execution unit that executes a predetermined process by comparing results of the person detection process for each of the first video frame and the second video frame.

A control method according to the present invention is executed by a computer. The control method includes: 1) a stationary object detection step of detecting a stationary object from video data; 2) a person detection step of executing person detection process of detecting a person in vicinity of a target object for each of a first video frame and a second video frame, the target object being an object detected as the stationary object, the first video frame including the target object, the second video frame including the target object and being generated after the first video frame; and 3) a processing execution step of executing a predetermined process by comparing results of the person detection process for each of the first video frame and the second video frame.

A program according to the present invention causes the computer to execute each step of the control method according to the present invention.

Advantageous Effects of Invention

According to the present invention, there is provided a technology for accurately detecting a left object from a video.

BRIEF DESCRIPTION OF THE DRAWINGS

The above-described object, other objects, features, and advantages will be further clear through preferable embodiments which will be described below and accompanying drawings below.

DESCRIPTION OF EMBODIMENTS

Hereinafter, embodiments of the present invention will be described with reference to the accompanying drawings.

Also, in all drawings, the same symbols are attached to the same components, and description is appropriately omitted. In addition, unless particular description is performed, each block in each block diagram represents a configuration in function units instead of a configuration in hardware units.

First Embodiment

<Outline>

As a way detecting a left object, there is a way to detect a stationary object from a video data and handle the stationary object as a left object. In addition, as a way of detecting the stationary object, there is a way to detect an object as a stationary object by detecting an object from each video frame constituting the video data, and detect the object as a stationary object when the object is stationary. Here, "the object is stationary" means that a state where a change of the location of the object is small (equal to or less than a predetermined threshold) is continuous. Therefore, the object is detected as a stationary object in a case where a state where a change of the location of the object is small continues.

However, as described above, a stationary object is not necessarily a left object. Therefore, in order to accurately detect a left object, the method of detecting the stationary object as the left object is not sufficient.

Figure 1:
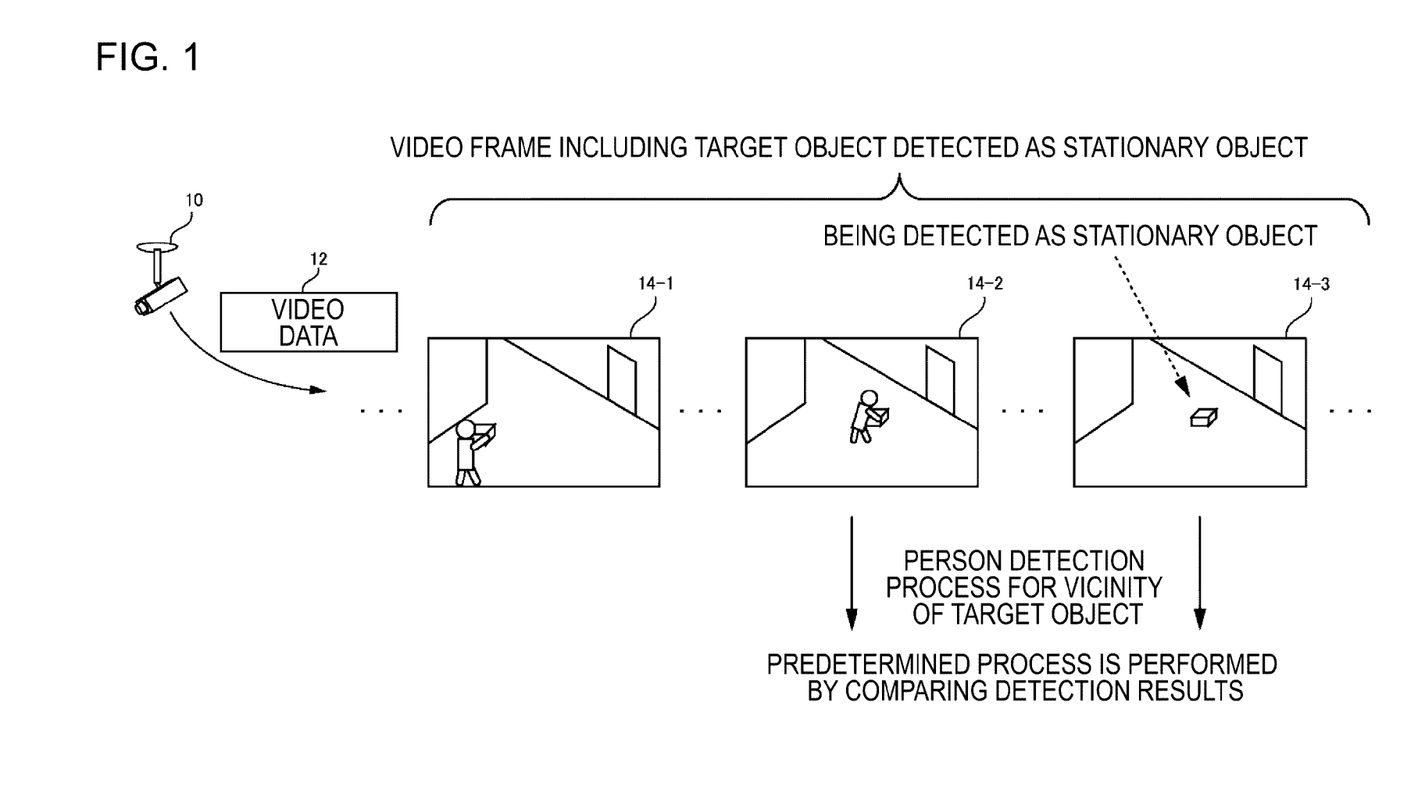
FIG. 1 is a diagram illustrating an outline of an operation of an information processing apparatus according to a present embodiment.

Accordingly, an information processing apparatus of the present embodiment performs further processes when a stationary object is detected from the video data. FIG. 1 is a diagram illustrating an outline of an operation of an information processing apparatus (information processing apparatus 2000 described in FIG. 2) of the present embodiment. FIG. 1 is an example for ease of understanding about the information processing apparatus 2000, and the operation of the information processing apparatus 2000 is not limited thereto.

The information processing apparatus 2000 detects the stationary object from video data 12. Furthermore, the information processing apparatus 2000 performs a process (hereinafter, person detection process) of detecting a person present in vicinity of the target object from a plurality of video frames 14 including the object (hereinafter, the target object) detected as the stationary object. Then, a predetermined process is performed by comparing results of the person detection process for each video frame 14. As described later, for example, the predetermined process includes a process of warning executed in a case where the probability of that the target object is a left object is high, or a process of determining a state of the target object (determining whether the target object is being left).

For example, it is assumed that the target object detected as a stationary object is not a left object but an object placed by the owner. In this case, a state of the owner being in the vicinity of the target object continues. On the other hand, in a case where the target object is a left object, the owner disappears from the vicinity of the target object. Therefore, in order to distinguish the cases, the information processing apparatus 2000 performs the person detection process of detecting a person being in the vicinity of the target object with respect to the video frame 14 including the target object at each different time-point, and then the result is compared. In this way, comparing to the method of detecting a stationary object as a left object, it is possible to accurately detect a left object.

Hereinafter, the information processing apparatus 2000 of the embodiment will be described in further detail.

Example of Functional Configuration of Information Processing Apparatus 2000

Figure 2:
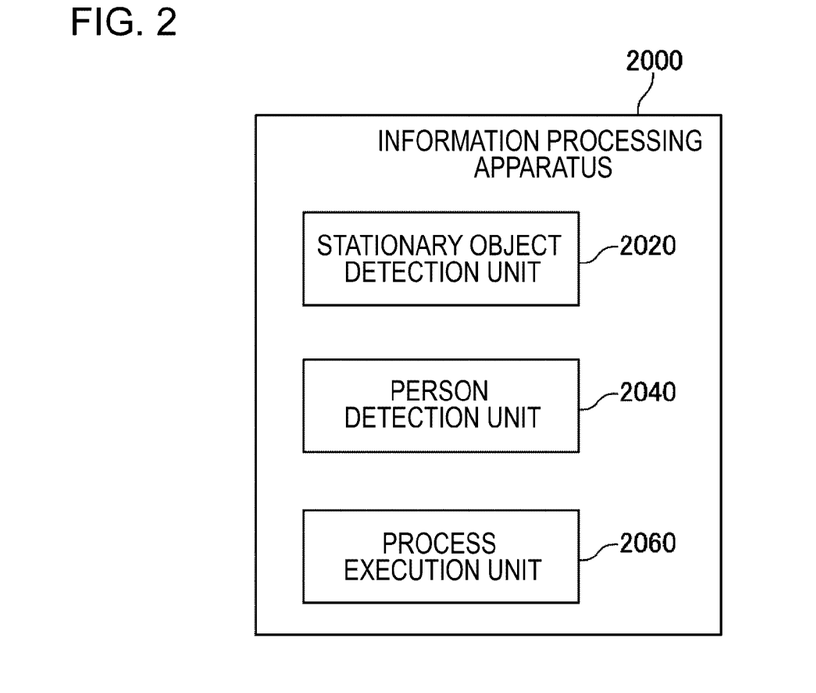
FIG. 2 is a diagram illustrating a configuration of the information processing apparatus according to a first embodiment.

FIG. 2 is a diagram illustrating the configuration of the information processing apparatus 2000 according to the first embodiment. The information processing apparatus 2000 includes a stationary object detection unit 2020, a person detection unit 2040, and a process execution unit 2060. The stationary object detection unit 2020 detects a stationary object from the video data 12. The person detection unit 2040 executes person detection process of detecting a person in the vicinity of the target object for each of a plurality of video frames 14 which includes an object (target object) detected as the stationary object. The process execution unit 2060 executes the predetermined process by comparing the results of the person detection process for each of the plurality of video frames.

<Hardware Configuration of Information Processing Apparatus 2000>

Respective functional configuration units of the information processing apparatus 2000 may be realized by hardware (for example, a hard-wired electronic circuit or the like) which realizes the respective functional configuration units, or may be realized through a combination (for example, a combination of an electronic circuit and a program controlling the electronic circuit, or the like) of hardware and software. Hereinafter, a case where the respective functional configuration units of the information processing apparatus 2000 are realized through the combination of the hardware and the software will be further described.

Figure 3:
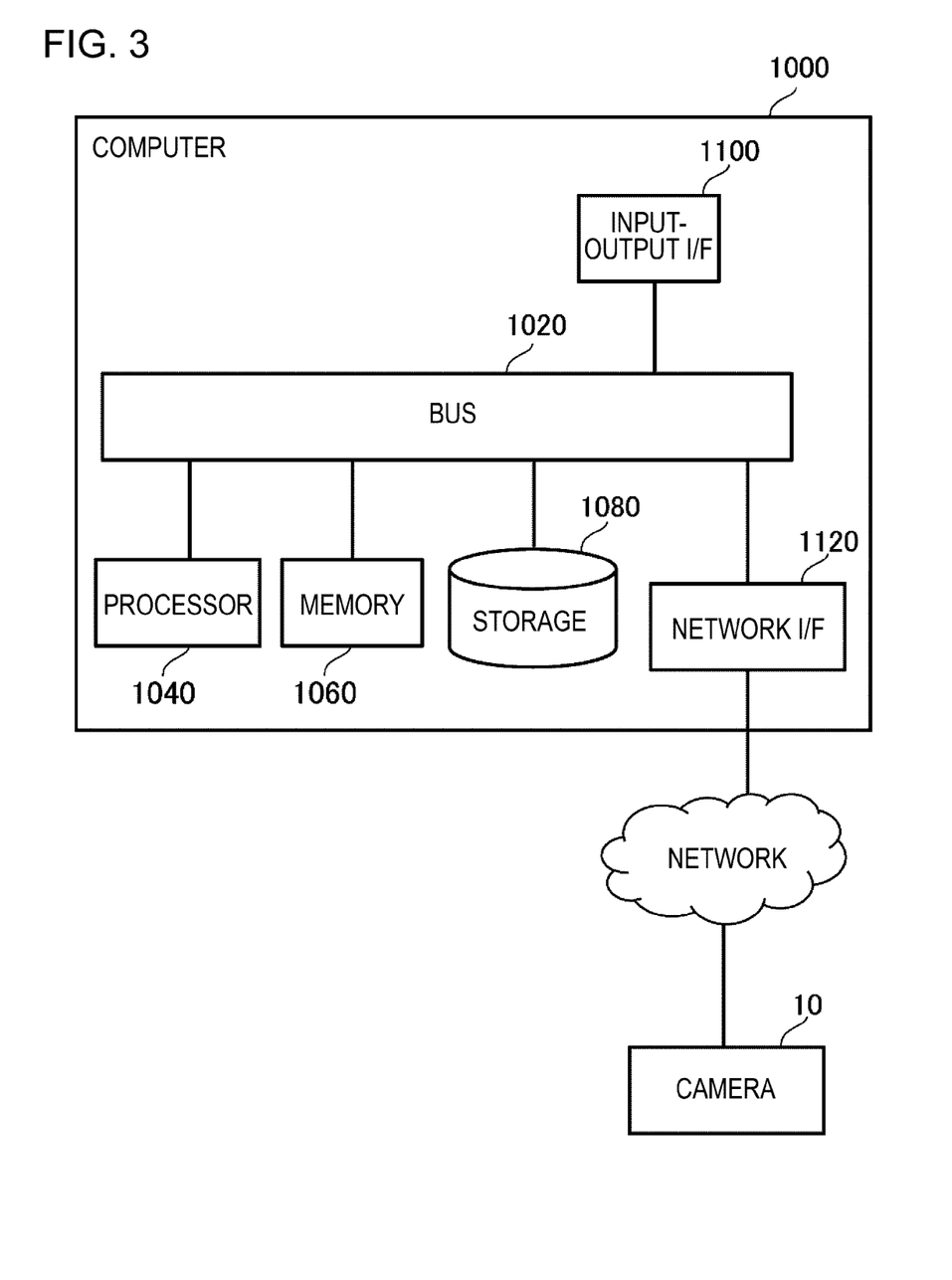
FIG. 3 is a diagram illustrating a computer which is used to realize the information processing apparatus.

FIG. 3 is a diagram illustrating a computer 1000 which is used to realize the information processing apparatus 2000. The computer 1000 is an optional computer. For example, the computer 1000 includes a Personal Computer (PC), a server machine, a tablet terminal, a smartphone, or the like. The computer 1000 may be a dedicated computer which is designed to realize the information processing apparatus 2000, or a general-purpose computer.

The computer 1000 includes a bus 1020, a processor 1040, a memory 1060, a storage device 1080, an input-output interface 1100, and a network interface 1120. The bus 1020 is a data transmission line which is used for the processor 1040, the memory 1060, the storage device 1080, the input-output interface 1100, and the network interface 1120 to transmit and receive data to and from each other. However, a method for connecting the processor 1040 and the like to each other is not limited to bus connection. The processor 1040 is an arithmetic unit such as a Central Processing Unit (CPU) or a Graphics Processing Unit (GPU). The memory 1060 is a main memory unit which is realized using a Random Access Memory (RAM) or the like. The storage device 1080 is an auxiliary storage unit which is realized using a hard disk, a Solid State Drive (SSD), a memory card, a Read Only Memory (ROM), or the like. However, the storage device 1080 may include hardware which is the same as hardware, such as the RAM, included in the main memory unit.

The input-output interface 1100 is an interface which is used to connect the computer 1000 to an input-output device. The network interface 1120 is an interface which is used to connect the computer 1000 to a communication network. The communication network is, for example, a Local Area Network (LAN) or a Wide Area Network (WAN). A method for connecting to the communication network via the network interface 1120 may be wireless connection or wired connection.

For example, the computer 1000 is communicably connected to a camera 10 through the network. However, a method for communicably connecting the computer 1000 to the camera 10 is not limited to connection through the network. In addition, the computer 1000 may not be communicably connected to the camera 10.

The storage device 1080 stores program modules which are used to realize the respective functional configuration units (the stationary object detection unit 2020, the person detection unit 2040, and the process execution unit 2060) of the information processing apparatus 2000. The processor 1040 realizes functions corresponding to the respective program modules by reading and executing the respective program modules in the memory 1060.

The computer 1000 may be realized using a plurality of computers. For example, the stationary object detection unit 2020, the person detection unit 2040, and the process execution unit 2060 can be realized by different computers. In this case, the program modules stored in the storage device of each computer may be only the program modules corresponding to the functional configuration units realized by the computer.

<Camera 10>

The camera 10 is an optional camera which can generate the video data 12 by repeatedly performing imaging. For example, the camera 10 is a surveillance camera provided to monitor a specific facility or a road.

A part or all of the functions of the information processing apparatus 2000 may be realized by the camera 10. That is, the camera 10 may be used as the computer 1000 for realizing the information processing apparatus 2000. In this case, the camera 10 processes the video data 12 generated by itself. It is possible to use, for example, an intelligent camera, a network camera, or a camera which is called an Internet Protocol (IP) camera, as the camera 10 which realizes the information processing apparatus 2000.

<Flow of Process>

Figure 4:
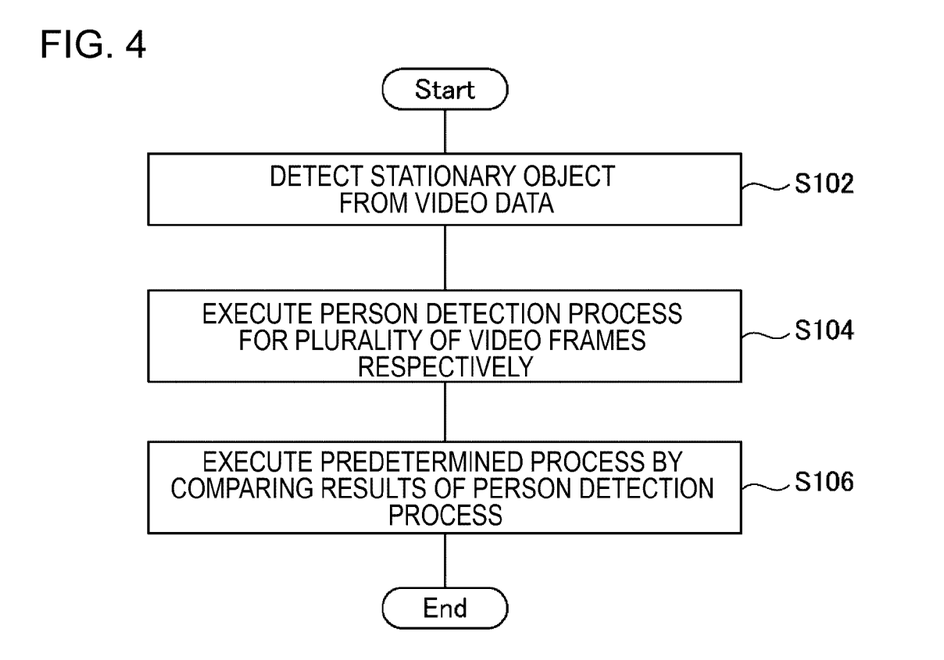
FIG. 4 is a flowchart illustrating a flow of a process executed by the information processing apparatus according to the first embodiment.

FIG. 4 is a flowchart illustrating a flow of processes executed by the information processing apparatus 2000 according to the first embodiment. The stationary object detection unit 2020 detects the stationary object from the video data 12 (S102). The person detection unit 2040 executes the person detection process of detecting a person in the vicinity of the target object for each of the plurality of video frames 14 which includes the target object (S104). The process execution unit 2060 executes the predetermined process by comparing the results of the person detection process for each of the plurality of video frames (S106).

<Method of Acquiring video data 12>

The information processing apparatus 2000 acquires video data 12 to be processed. There are various methods of acquiring the video data 12 by the information processing apparatus 2000. For example, the information processing apparatus 2000 receives the video data 12 transmitted from the camera 10. In another example, the information processing apparatus 2000 accesses the camera 10 and acquires the video data 12 stored in the camera 10.

Note that, the camera 10 may store the video data 12 in a storage unit provided outside the camera 10. In this case, the information processing apparatus 2000 accesses the storage unit to acquire the video data 12. Therefore, in this case, the information processing apparatus 2000 and the camera 10 may not be communicably connected.

In a case where a part or all of the functions of the information processing apparatus 2000 is realized by the camera 10, the information processing apparatus 2000 acquires the video data 12 which are generated by the information processing apparatus 2000 itself. In this case, the video data 12 are stored in, for example, the storage unit (the storage device 1080) provided inside the information processing apparatus 2000. Therefore, the information processing apparatus 2000 acquires the video data 12 from the storage units.

The timing at which the information processing apparatus 2000 acquires the video data 12 is arbitrary. For example, each time a new video frame 14 constituting the video data 12 is generated by the camera 10, the information processing apparatus 2000 acquires the video data 12 by acquiring the newly generated video frame 14. In another example, the information processing apparatus 2000 may periodically acquire unacquired video frames 14. For example, in a case where the information processing apparatus 2000 acquires the video frames 14 once a second, the information processing apparatus 2000 collectively acquires a plurality of video frames 14 (for example, in a case where a frame rate of the video data 12 is 30 frames/second (fps), the number of video frames 14 is 30) generated per second.

The stationary object detection unit 2020 may acquire all the video frames 14 constituting the video data 12 or may acquire only a part of the video frames 14. In the latter case, for example, the stationary object detection unit 2020 acquires the video frame 14 generated by the camera 10 at a ratio of one frame per a predetermined number of frames.

<Detection of Stationary Object: S102>

The stationary object detection unit 2020 detects the stationary object from the video data 12 (S102). A well-known technique may be used as a technique for detecting the stationary object from the video data. Hereinafter, an example of a method of detecting a stationary object from the video data 12 will be described.

The stationary object detection unit 2020 detects an object from each video frame 14 constituting the video data 12. The stationary object detection unit 2020 computes the variation amount of the position of the object for each of the plurality of video frames 14 which includes the same object. The stationary object detection unit 2020 detects the object as the stationary object if a state where the variation of the position of the object is less than or equal to a predetermined amount continues for a predetermined period. Here, in a case where an object is detected as the stationary object by the stationary object detection unit 2020, the predetermined period during which the state where the variation of the position of the object is less than or equal to a predetermined amount continues is referred to as a stationary determination period.

Figure 5:
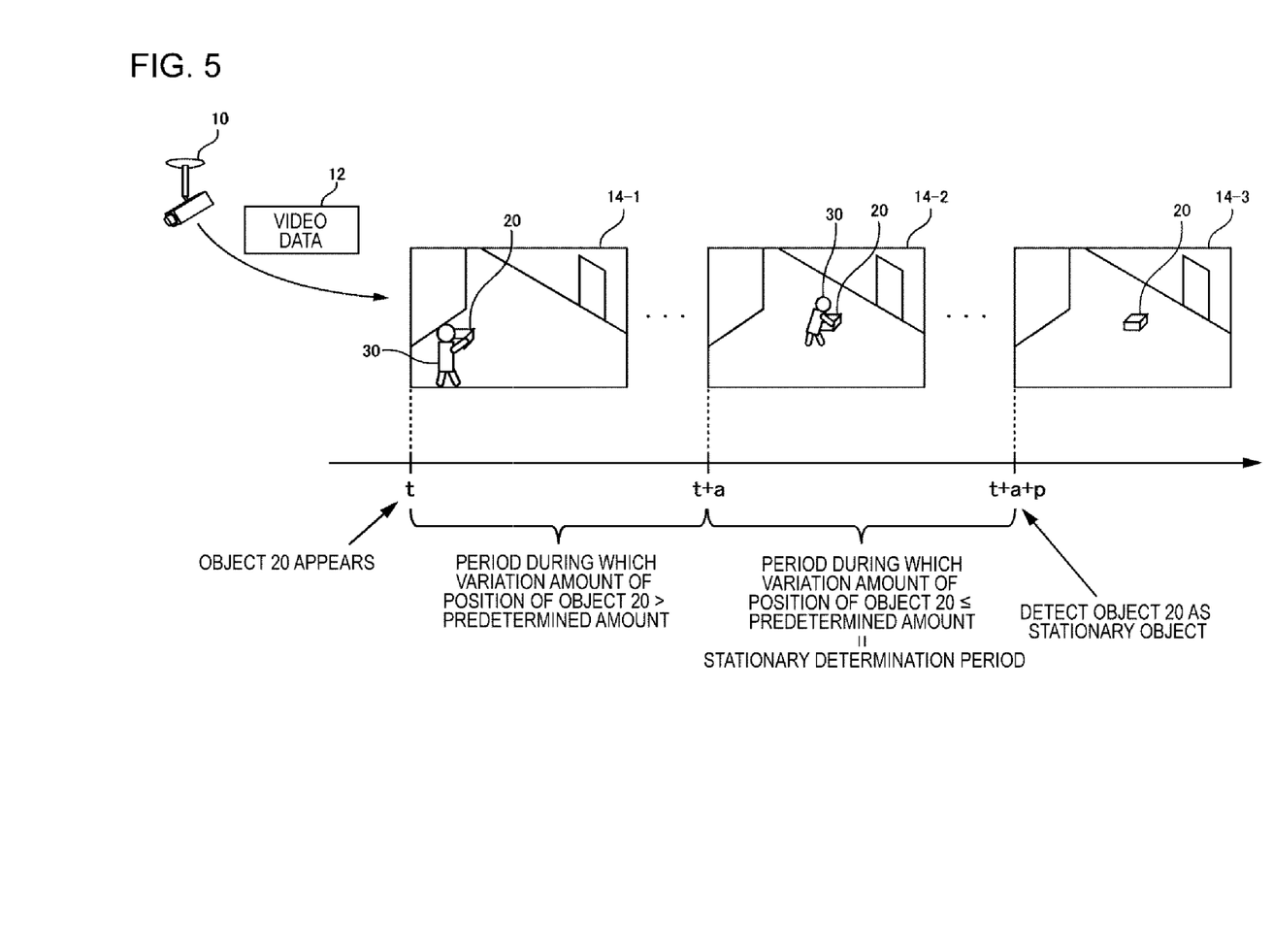
FIG. 5 is a diagram conceptually illustrating a method of detecting a stationary object from video data.

FIG. 5 is a diagram conceptually illustrating a method of detecting the stationary object from the video data 12. In this example, the stationary object detection unit 2020 detects the object as the stationary object in a case where the period during which the variation amount of the position of the object is equal to or less than the predetermined value is more than or equal to p.

In the video data 12 illustrated in FIG. 5, an object 20 is detected from each video frame 14 after the time-point t. The stationary object detection unit 2020 computes the variation amount of the position of the object 20 by computing the difference in the positions of the object 20 for each combination of two video frames 14 adjacent to each other in time series.

First, at the time-point t, a person 30 holding the object 20 appears. The person 30 is moving with the object 20 until the time-point t+a. Therefore, the variation amount of the position of the object 20 computed for the period from the time-point t to time-point t+a has a value larger than the predetermined amount. As a result, in the determination using the video frames 14 generated in the period, the object 20 is not detected as the stationary object.

Then, after the time-point t+a, the object 20 is being placed on the ground. Therefore, the variation amount of the position of the object 20 detected from each video frame 14 after the time-point t+a is less than or equal to the predetermined amount. Accordingly, the stationary object detection unit 2020 detects the object 20 as the stationary object on the basis of the determination using the video frames 14 generated in the period from the time-point t+a to the time-point t+a+p.

In another example, the stationary object detection unit 2020 may generate a background image (an image only comprising the background) using the video frame 14 and may detect the stationary object on the basis of the background difference. First, the stationary object detection unit 2020 generates a background image from the video frame 14 in the time-series. Various known techniques can be used to generate the background image. Next, the stationary object detection unit 2020 computes the difference between a newly acquired video frame 14 and the background image. Then, the stationary object detection unit 2020 extracts a region in which the difference is large. The stationary object detection unit 2020 executes the above described process each time that the video frame 14 is acquired, compares acquired extraction results between the frames, and determines whether or not the variation amount of the position of the object is within the predetermined amount.

In the case of FIG. 5, it is assumed that the above described background difference is used. In this case, the variation amount of the position of the object 20 computed for a period from the time-point t to the time-point t+a has a value larger than the predetermined amount. On the other hand, after the time-point t+a, the variation amount of the position of the object 20 is less than or equal to the predetermined amount. Therefore, even in a case of using the background difference, the object 20 is detected as the stationary object on the basis of the determination using the video frames 14 that is generated in the period from the time-point t+a to the time-point t+a+p.

A method of determining a movement of the object is not limited to the above method. For example, various methods can be used such as a method of "extracting feature points in an object and correlating feature points between adjacent frames to obtain a movement amount of the object".

<Person Detection Process: S104>

The person detection unit 2040 executes the person detection process of detecting the person in the vicinity of the target object for each of the plurality of video frames 14 which includes the target object (the object detected as the stationary object) (S104). Hereinafter, in the video frame 14, an image region around the target object is referred to as a vicinity region. For example, in the example of FIG. 5 described above, "the plurality of video frames 14 which include the target objects" are respective video frames 14 generated after the time-point t. The video frames 14 include the object 20 which is the object detected as the stationary object.

Here, a well-known technique (for example, feature matching, template matching, and the like) can be used as a method of detecting a person from a video frame (that is, image data). For example, in a case of using the feature matching, the person detection unit 2040 detects a person by detecting an image region from the video frame 14, the image region having a feature value that represents features of an appearance of person.

Here, the person detection process may be a process of detecting an image region representing a person entirely, or may be a process of detecting an image region representing a part (for example, head) of a person. Here, in a case where many people or objects are included in an imaging range of the camera 10, there is a high probability that a part of the person is hidden by another person or object. In this case, the head may be a part having a low probability of being hidden by another person or the like (a part having a high probability of being imaged by the camera 10) compared to the lower body and the like. In addition, the head may be a part well representing the features of an individual. Therefore, there are advantages in performing the process of detecting the head in the person detection process as follows: 1) the probability capable of detecting the person from the video frame 14 is high; and 2) the person can be detected in a manner of being easily distinguished from other people.

The vicinity region may be an image region corresponding to the entire video frame 14 or may be an image region corresponding to a part of the video frame 14. In a case where the image region corresponding to a part of the video frame 14 is handled as the vicinity region, for example, an image region having a predetermined shape based on the position of the target object is handled as the vicinity region. Here, arbitrary position (for example, center position) included in the image region representing an object may be handled as the position of the object. Furthermore, the predetermined shape can be, for example, a circle or a rectangle having a predetermined size. The vicinity region may or may not include the target object. Information defining the predetermined shape may be set in advance in the person detection unit 2040 or may be stored in a storage unit accessible from the person detection unit 2040.

Figure 6A:
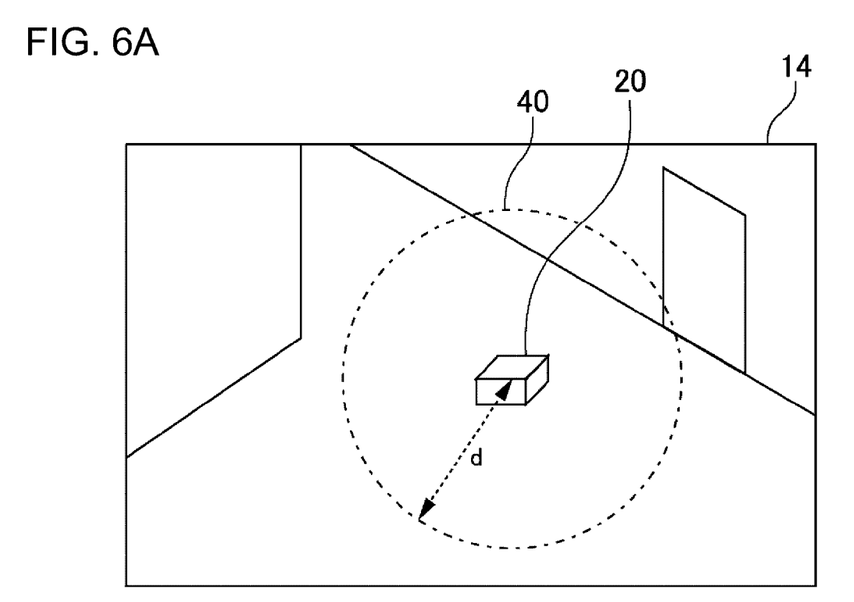
FIGS. 6A and 6B are diagrams illustrating a vicinity region defined as an image region of a part of a video frame.
Figure 6B:
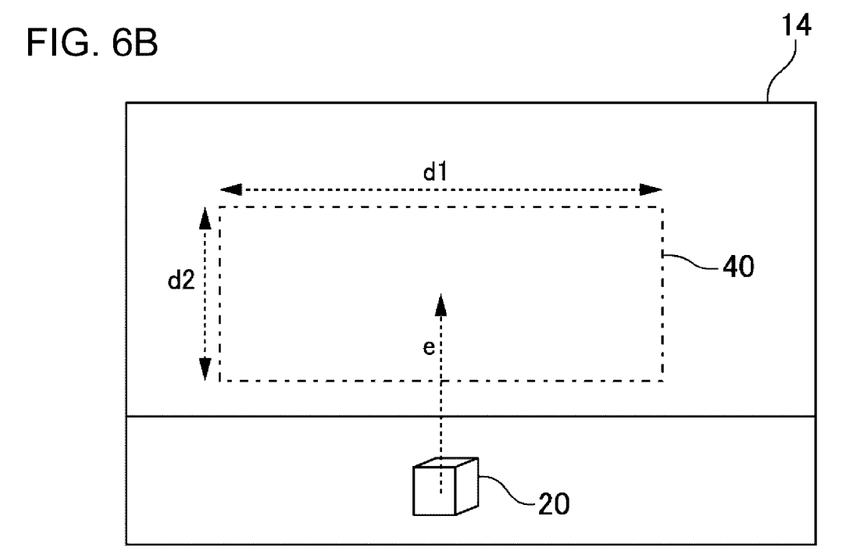

FIGS. 6A and 6B are diagrams illustrating a vicinity region defined as an image region of a part of a video frame 14. In FIGS. 6A and 6B, the target object is an object 20. In FIG. 6A, the predetermined shape is a circle with radius d. A center position of the vicinity region 40 is a center position of the object 20. In FIG. 6B, the predetermined shape is a rectangle having a long side d1 and a short side d2. In addition, the center position of the vicinity region 40 is a position distant from the center position of the object 20 toward an upper direction by a predetermined distance e.

Note that, according to the position of the vicinity region 40 in the image, the predetermined shape which defines the vicinity region 40 may be changed. For example, a size of the predetermined shape is defined larger in a place closer to the camera 10, and a size of the camera 10 is defined smaller in a place farther from the camera 10. In another example, the predetermined shape is defined such that a size of the vicinity region 40 in a real-space is constant. Here, the size of the vicinity region 40 in the real-space can be estimated using calibration information of the camera 10. The calibration information of the camera 10 includes information of various parameters (position and pose of the camera, lens distortions, or the like) required to convert coordinates on the camera 10 into coordinates on the real-space. Well-known techniques can be used to generate calibration information.

<<Video Frame 14 to be Subject to Person Detection Process>>

The person detection unit 2040 executes the person detection process for at least two video frames 14 among the plurality of video frames 14 including the target object.

Hereinafter, the two video frames 14 will be referred to as the first video frame and the second video frame. The second video frame is a video frame 14 generated after the first video frame is generated. Hereinafter, a method of defining the video frame 14 to be regarded as the first video frame and the second video frame will be described.

In a case where an object is left in a place by a person, the person is present in the vicinity of the object at least until the object is placed in the place. On the other hand, after a while the object is left, there is a high probability that the person is non-existent in the vicinity of the object. Therefore, in a case where the person who was present in the vicinity of the target object around a time-point when the target object is left or before the time-point becomes non-existent in the vicinity of the target object after a while since the target object is left, it can presumed that the target object is left.

Therefore, for example, a video frame 14 generated at the start time-point of the above-described stationary determination period or the time-point near that (the time-point before or after the predetermined time) may be adopted as the first video frame. For example, in the example of FIG. 5, the start time-point of the stationary determination period is the time-point t+a. Therefore, when handling the video frame 14 generated at the start time-point of the stationary determination period as the first video frame, the video frame 14-2 is the first video frame.

In another example, the first video frame may be determined on the basis of the time-point at which the target object extracted at the end time-point t+a+p of the stationary determination period is actually left (hereinafter, referred to as left time-point). This is because the time-point from which the target object is determined to be stationary (the start time-point of the stationary determination period) does not necessarily coincide with the time-point at which the target object is actually placed, in a case where the camera 10 images a place where people come and go.

Therefore, the person detection unit 2040 estimates the left time-point of the target object. For example, the person detection unit 2040 extracts an image feature value of the target object from the video frame 14 generated at the end time-point t+a+p of the stationary determination period, and then it is retroactively examined whether that feature value is detected at the same position in each video frame 14 generated before the time-point t+a+p. Then, the person detection unit 2040 estimates that the time-point at which the image feature value of the target object becomes undetected is, for example, an estimated left time-point. The first video frame determined on the basis of the left time-point is, for example, a video frame 14 generated at the left time-point or a video frame 14 generated before or after a predetermined time with respect to the left time-point.

In another example, the video frame 14 (the video frame 14 in which the target object appears) having the earliest generation time-point among the video frames 14 including the target object may be adopted as the first video frame. For example, in the example of FIG. 5, the video frame 14 in which the target object appears is the video frame 14-1.

In another example, a video frame 14 generated before a predetermined time from a generation time-point of the second video frame may be adopted as the first video frame.

On the other hand, for example, the video frame 14 generated at or near the end time-point of the above described stationary determination period (the time-point before or after the predetermined time) can be adopted as the second video frame. In the example of FIG. 5, the end time-point of the stationary determination period is t+a+p. Therefore, assuming that the video frame 14 generated at the end time-point of the stationary determination period is the second video frame, the video frame 14-3 is the second video frame. In another example, a video frame 14 generated after the predetermined time from a generation time-point of the first video frame may be adopted as the second video frame.

The person detection unit 2040 may cause other video frames 14 in addition to the first video frame and the second video frame described above to be subject to the person detection process. For example, in a case where the person included in the first video frame is being crouched down, there is a possibility that the person cannot be detected due to the change of pose although the person is included in the first video frame. Therefore, for example, the person detection unit 2040 also causes a plurality of video frames 14 which are generated within a predetermined time before and after the generation time-point of the first video frame to be subject to the person detection process. Similarly, the person detection unit 2040 also causes a plurality of video frames 14 which are generated within a predetermined time before and after the generation time-point of the second video frame to be subject to the person detection process.

<Execution of Predetermined Process: S106>

The process execution unit 2060 executes the predetermined process by comparing the result of the person detection process for each of the plurality of video frames 14 which includes the target object (S106). The predetermined process includes, for example, 1) process of warning in a case where a predetermined condition is satisfied, 2) process of determining a state of the target object, and 3) process of tracking a person who is presumed to have left the target object. Hereinafter, these processes will be described in detail.

<<Process of Warning>>

Figure 7:
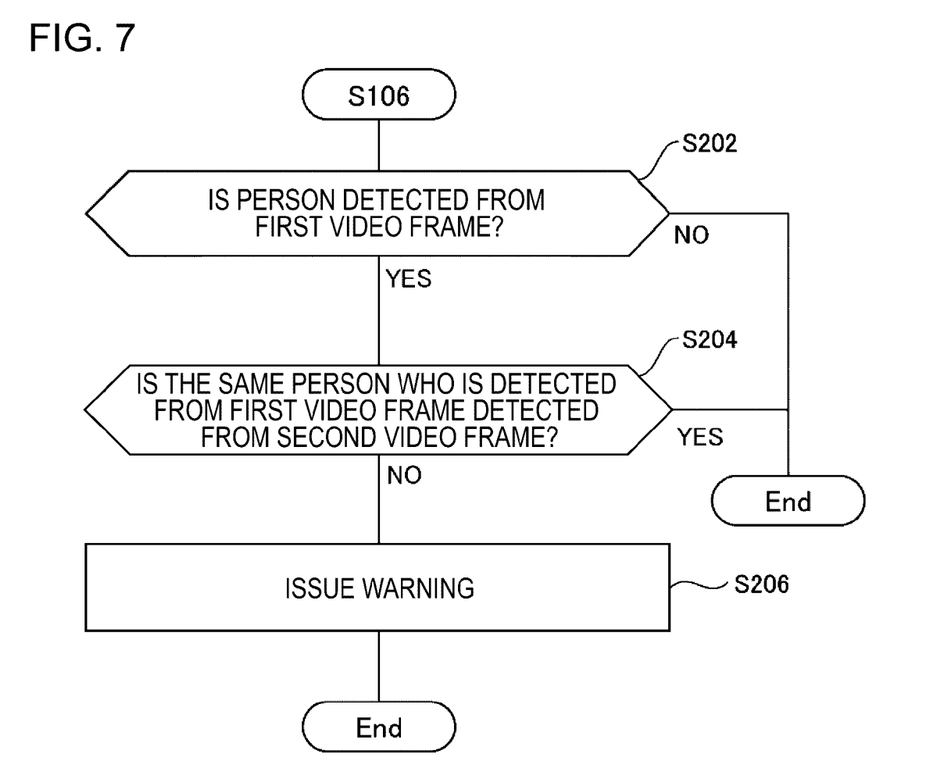
FIG. 7 is a diagram illustrating a flow of processing of warning executed by a process execution unit.

FIG. 7 is a diagram illustrating the flow of the process of warning performed by the process execution unit 2060. In the example, the process execution unit 2060 compares the person detection result for the first video frame with the person detection result for the second video frame.

First, the process execution unit 2060 determines whether a person is detected by person detection process for the first video frame (S202). In a case where no person is detected, the process in FIG. 7 ends (no warning is issued). The case where a person in the vicinity of the target object is not detected in the first video frame is, for example, a case where the target object suddenly appears within the imaging range of the camera 10 instead of moving from outside the imaging range of the camera 10. For example, it is assumed that the target object is an object (such as a signboard or a bronze statue) fixed and installed at a position within the imaging range of the camera 10. In this case, in a case where the target object is hidden by another object (for example, a machine such as a car), the target object is not imaged by the camera 10. However, when the object hiding the target object moves, the target object is imaged by the camera 10. That is, from the viewpoint of the camera 10, the target object suddenly appears. In another example, there is a case where a difference with the background image is generated due to change of environmental light so that the target object is detected as if the object suddenly appears in the video data 12. In the cases, there is a high probability that the object is not being left. Therefore, the process execution unit 2060 does not issue a warning.

In a case where a person is detected in the person detection process for the first video frame (S202: YES), a feature value (the feature value of a part of a person such as face or head, or the feature value of the person's clothes or belongings) required for person matching is extracted from a region (person region) where the person is detected, and thereafter the process in FIG. 7 proceeds to S204. In S204, the process execution unit 2060 determines whether or not the same person as the person detected by the person detection process for the first video frame is detected by the person detection process for the second video frame. In this case, feature values required for person matching are extracted from the person area if the person is detected from the first video frame. Then, in a case where the similarity between the feature value extracted from the first video frame and the feature value extracted from the second video frame is higher than a predetermined threshold, the process execution unit 2060 determines that the same person is detected from the video frames.

In a case where the same person is detected (S204: YES), the process in FIG. 7 ends (no warning is issued). In this case, the same person exists in the vicinity of the target object at the generation time-point of the first video frame and the generation time-point of the second video frame. That is, in the above case, the person who places the target object keeps staying in the vicinity thereof, and there is a high probability that the target object is not being left. Therefore, the process execution unit 2060 does not issue a warning.

On the other hand, in a case where the same person as a person detected by the person detection process for the first video frame is not detected by the person detection process for the second video frame (S204: NO), the process execution unit 2060 issues a warning (S206). The above case is a case where 1) the person is not detected by the person detection process for the second video frame, or 2) the person detected by the person detection process for the second video frame is different from the person detected by the person detection process for the first video frame. In any case, there is a high probability that the person who places the target object does not exist in the vicinity of the target object, and the target object is left. Thus, the process execution unit 2060 issues a warning.

Note that, it is considered that a plurality of persons are detected from the first video frame and the second video frame. In this case, for example, in a case where any one of the plurality of persons detected from the first video frame is the same as any one of the plurality of persons detected from the second video frame, the process execution unit 2060 determines that "the same person as the person detected by the person detection process for the first video frame is detected by the person detection process for the second video frame". On the other hand, in a case where all the persons detected from the first video frame are different from any one of the plurality of persons detected from the second video frame, the process execution unit 2060 determines that "the same person as the person detected by the person detection process for the first video frame is not detected by the person detection process for the second video frame".

In another example, the process execution unit 2060 determines the level of the probability of the person (the leaver) who left the target object for the plurality of persons detected from the first video frame, and determines that the person is the same person using the determined result. For example, the process execution unit 2060 computes, for each person detected from the first video frame, the likelihood of the leaver according to the distance between the detection position and the target object. That is, as the distance between the detection position of the person and the target object is small, the likelihood regarding this person is increased. At this time, the distance between the detection position of the person and the target object may be a distance on the video frame 14 or may be a distance in the real-space. The distance in the real-space can be estimated using calibration information of the camera 10. Then, for example, in a case where any one of the persons who has a likelihood greater than or equal to the predetermined value among the persons detected from the first video frame is also detected from the second video frame, the process execution unit 2060 determines that "the same person as the person detected by the person detection process for the first video frame is detected by the person detection process for the second video frame".

In the above-described example, although the person detection result for the first video frame is compared with the person detection result for the second video frame, the process execution unit 2060 does not necessarily have to compare them. For example, instead of the result of the person detection process for the first video frame, the result of the person detection process for any video frame 14 generated within a predetermined time before or after the generation time-point of the first video frame may be used. For example, it is assumed that as a result of performing the person detection process for the first video frame and for each of the plurality of video frames 14 which generated within a predetermined time before and after the generation time-point of the first video frame, the same person is detected from any of the plurality of video frames 14. In this case, the process execution unit 2060 uses the result of the person detection process in which the person is most clearly detected. The above is applied to the second video frame as well.

In addition, the process execution unit 2060 may also determine whether to perform the process of warning by comparing three or more video frames 14. For example, the person detection unit 2040 also performs the person detection process on one or more video frames 14 generated between the first video frame and the second video frame. Hereinafter, the video frame 14 generated between the first video frame and the second video frame is referred to as an intermediate frame. Then, the process execution unit 2060 determines whether to issue a warning on the basis of the result of the person detection process for each of the first video frame, the second video frame, and one or more intermediate video frames. In this way, whether the person who places the target object keeps staying in the vicinity thereof is more accurately determined.

For example, instead of the determination in S204 described above, the process execution unit 2060 determines whether the same person as a person detected from the first video frame is detected from one or more intermediate frames in addition to the second video frame. Then, for example, the process execution unit 2060 issues a warning in a case where the same person as a person detected from the first video frame is not detected in a video frame 14 between the second video frame and the intermediate frame. On the other hand, the process execution unit 2060 does not issue a warning in a case where the same person as a person detected from the first video frame is detected in the second video frame and all the intermediate frames. Note that, the person detected from the first video frame may not necessarily be detected from all the intermediate frames. For example, the process execution unit 2060 may not issue a warning in a case where the same person as the person detected from the first video frame is detected from the intermediate frame of a predetermined ratio or more.

In another example, the process execution unit 2060 firstly determines whether a person detected from the first video frame and a person detected from the second video frame are the same, and then only in a case where the determination is not sufficiently accurate, the intermediate frames may be used. For example, it is assumed that the process execution unit 2060 determines that the persons are identical based on the similarity between the feature value of the person detected from the first video frame and the feature value of the person detected from the second video frame. In this case, for example, the process execution unit 2060 determines that 1) the detected person is the same in a case where a similarity is more than or equal to the first predetermined value, 2) the detected person is not the same in a case where a similarity is less than the second predetermined value (the value less than the first predetermined value), and 3) the determination accuracy is not sufficient in a case where a similarity is more than or equal to the second predetermined value and less than the first predetermined value. In the case of 3), the process execution unit 2060 further determines whether the person detected from the first video frame is detected from the intermediate frames.

Warning issued by the process execution unit 2060 is arbitrary. For example, the process execution unit 2060 outputs a warning sound or outputs predetermined information to issue a warning. The predetermined information is, for example, information on the target object (hereinafter, object information). For example, the object information includes an image of the target object, a time-point and period when the target object is imaged, an identifier (frame number) of the video frame 14 including the target object, and an identifier of the camera 10 imaging the target object.

In another example, the predetermined information to be output includes information on a person who is presumed to have left the target object (hereinafter, person information). A person who is presumed to have left the target object is a person who is detected from the vicinity of the target object in the first video frame and is not detected from the vicinity of the target object in the second video frame.

For example, the person information includes an image and feature values of the person who is presumed to have left the target object, a time-point when the person enters the imaging range of the camera 10 (arrival time-point), and a time-point when the person goes out of the imaging range of the camera 10 (departure time-point). Here, the arrival time-point and the departure time-point can be estimated by, for example, performing a tracking process of person using the plurality of video frames 14 generated before and after the video frame 14 in which the person who is presumed to have left the target object is detected, and determining the time-point when the person moved from the place where the target object is placed. In another example, the arrival time-point or the departure time-point may be estimated based on the time-point when the person disappears from the imaging range of the camera 10. A well-known method can be used for the tracking process of person. Note that the movement speed of the person may be determined by the tracking process, and the movement speed may be included in the person information. The moving speed of a person who is estimated to have left the target object can be used to, for example, predict the appearance time-point of the person in other cameras in the vicinity described later.

In addition, in a case where the person who is presumed to have left the target object is included in other information regarding person, e.g. blacklist, the person information may include the information of the person indicated in the "other information".

An output destination of a warning is arbitrary. For example, the output destination of the warning is a speaker provided at a vicinity of a surveillance staff who monitors an image of the camera 10 in a security guard room, or a terminal used by the surveillance staff. Here, in a case where the video frame 14 including the target object is displayed on the terminal, an image region of the target object or the person who is presumed to have left the target object may be highlighted. For example, the image region may be framed by a frame, or moreover, the frame may be blinked. In addition, information on a size of the target object may be additionally presented. The size of the object can be estimated by converting the image region of the object into a real-space using calibration information of the camera. The information indicating the size of the target object is useful for determining the risk thereof, when the target object is a dangerous substance such as a bomb. In another example, the output destination of the warning is a terminal used by a security guard performing security at the site. Furthermore, for example, the output destination of the warning may be a terminal used in a predetermined organization such as a security company or the police.

Determination of State

The process execution unit 2060 determines a state of the target object. Specifically, the process execution unit 2060 determines whether the state of the target object is "left" or "not left.

Figure 8:
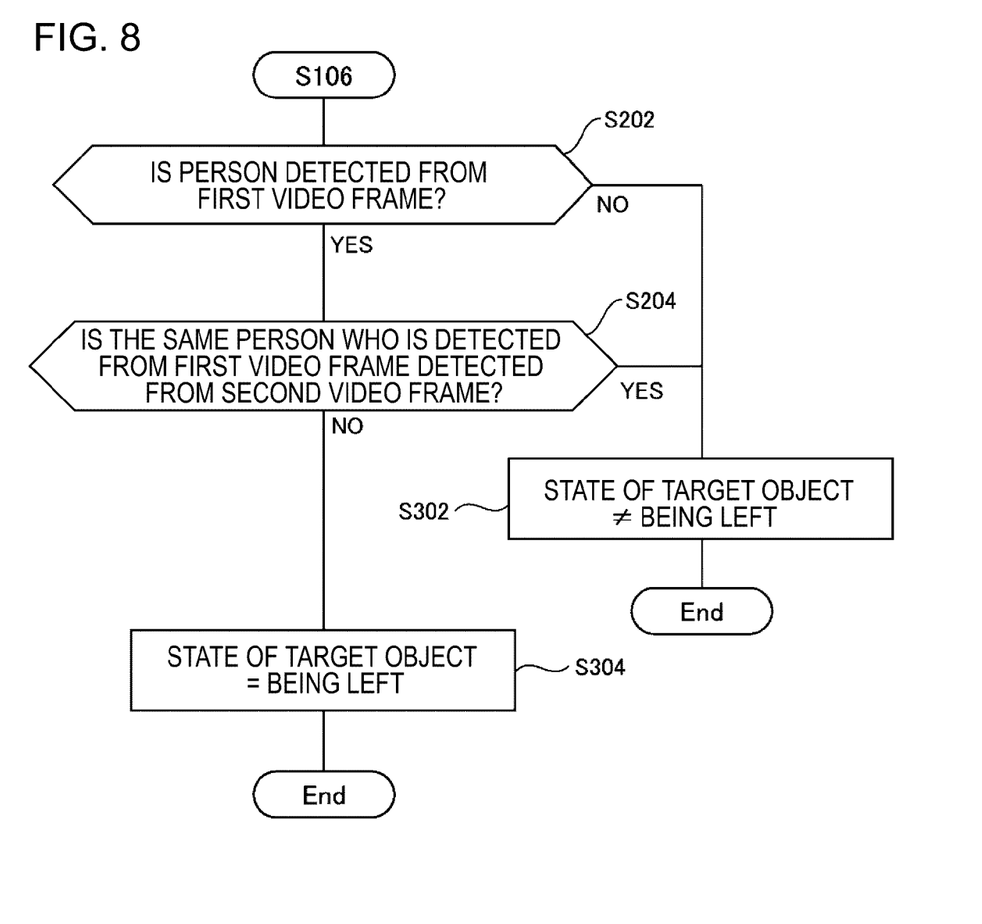
FIG. 8 is a flowchart illustrating a flow of processing in which a process execution unit specifies a state of a target object.

FIG. 8 is a flowchart illustrating a flow of process in which the process execution unit 2060 determines the state of the target object. Condition determination process in the flowchart is the same as the condition determination process in the flowchart of FIG. 7. Merely, the process performed as a result of respective state determination process differs between FIG. 7 and FIG. 8.

Specifically, in the case where "there is a high probability that the object is not being left" described in the flowchart of FIG. 7 (S202: NO, and S204: YES), the process execution unit 2060 determines a state of the target object "not being left" (S302). On the other hand, in the case where "there is a high probability that the object is being left" described in the flowchart of FIG. 7 (S204: NO), the process execution unit 2060 determines a state of the target object "being left" (S304).

For example, the process execution unit 2060 generates the above described object information regarding the target object determined as "being left", and writes the object information into a storage device. This storage device is any storage device (for example, a storage device 1080) which is accessible from the information processing apparatus 2000. Note that, the process execution unit 2060 may further generate the person information regarding the person who is presumed to have left the target object, and write the person information into the storage device.

In another example, the process execution unit 2060 may estimate a type of the left object. This is because handling or the like for the case of the left object being detected could differ depending on what the left object is. For example, in a case where the left object is a cart for carrying luggage or a notice board (for example, a board written with caution) that is placed on the floor for calling attention, urgent measures or careful measures are not necessarily required since their existence does not cause any major problem. On the other hand, in a case where the left object is a dangerous substance such as a bomb, urgent measures or careful measures are required.

Furthermore, the process execution unit 2060 may change the type of the warning according to a type of the object. In addition, the process execution unit 2060 may change subsequent processes according to the type of the object. For example, while the process execution unit 2060 make the storage device store the information if the left object is an object requiring urgent measures, the process execution unit 2060 does not make the storage device store the information if the left object is an object requiring no urgent measures.

The process execution unit 2060 may also generate object information on the target object determined as being in a state of "not left" as well. However, in this case, the object information also includes a determined state of the object.

<<Tracking Process>>

As described above, in a case where the same person as the person detected from the first video frame is not detected from the second video frame, the probability that the target object is left is high. Therefore, it is preferable to track a person who is presumed to have left the target object. Here, the tracking includes, for example, recognizing a current position of the person, recognizing a place where the person is predicted to move in the future, and recognizing behavior of the person until the target object is left.

Therefore, in a case where the same person as the person detected from the first video frame is not detected from the second video frame, the process execution unit 2060 detects a person who is presumed to have left the target object (a person detected from the first video data 12) from a video data 12 generated by a camera 10 different from the camera 10 that generates the first video frame. As a premise, it is assumed that a plurality of cameras 10 are provided in an environment where the information processing apparatus 2000 is used. For example, surveillance cameras are provided at a plurality of locations in a facility to be monitored. Therefore, a plurality of surveillance cameras provided in the plurality of locations are considered as cameras 10 respectively. In addition, hereinafter the "person who is presumed to have left the target object" is referred to as a person to be tracked.

The process execution unit 2060 acquires video data 12 from each of the plurality of cameras 10, and detects a person to be tracked from each video data 12. Here, as a technique for detecting a specific person from the video data 12, a well-known technique can be used. For example, the process execution unit 2060 detects the person to be tracked from each video data 12 by computing a feature value for the person to be tracked detected from the first video frame, and detecting an image region having the feature value from each video data 12.

The process execution unit 2060 may detect 1) only a video frame 14 generated before the generation time-point of the first video frame in which the person to be tracked is detected, 2) only a video frame 14 generated after the generation time-point of the first video frame, or 3) both video frames 14 described above. In the case 1), it is possible to recognize behavior (such as where the person came from) of the person to be tracked until the target object is left. On the other hand, in the case 2), it is possible to recognize behavior (such as a current position or where to go) of the person to be tracked after the target object is left.

Figure 9:
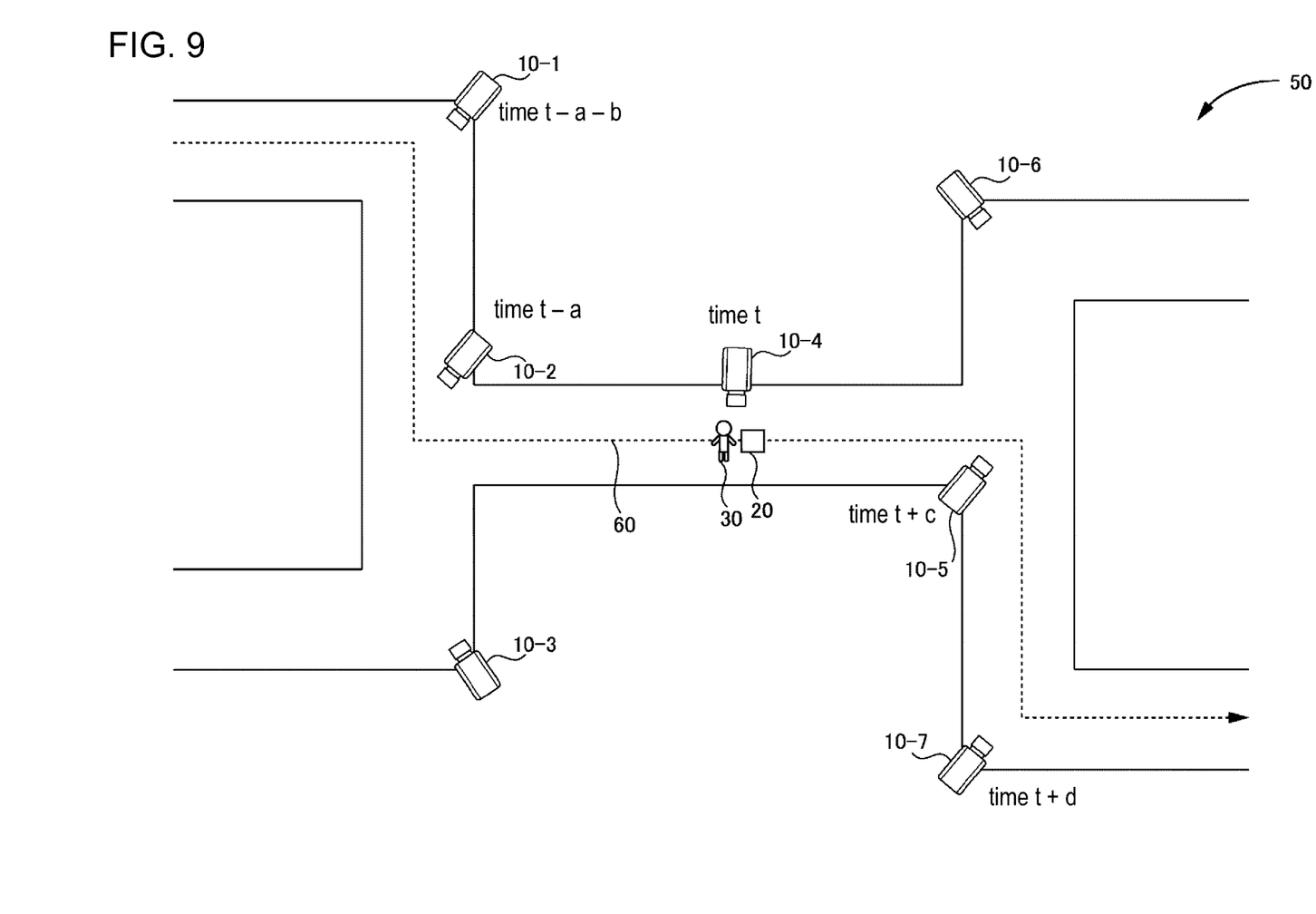
FIG. 9 is a diagram conceptually illustrating how a tracked person is detected from a plurality of cameras.

FIG. 9 is a diagram conceptually illustrating how the person to be tracked is detected from a plurality of cameras 10. Cameras 10-1 to 10-7 illustrated in FIG. 9 are part of surveillance cameras which are provided in order to monitor a facility 50.

In FIG. 9, the object 20 being left by a person 30 is detected from the video data 12 generated by the camera 10-4. Here, it is assumed that the person 30 who is the person to be tracked is detected from the first video frame generated by the camera 10-1 at a time t.

The process execution unit 2060 further analyzes each of the video data 12 generated by the camera 10-1 to the camera 10-3 and the camera 10-5 to the camera 10-7 to detect the person 30. As a result, the person 30 is detected in each of the video frame 14 generated by the camera 10-1 at a time t-a-b, the video frame 14 generated by the camera 10-2 at a time t-a, the video frame 14 generated by the camera 10-5 at a time t+c, and the video frame 14 generated by the camera 10-7 at a time t+c+d (a, b, c and d are respectively positive values). On the other hand, the person 30 is not detected from the video data 12 generated by the camera 10-3 and the video data 12 generated by the camera 10-6. Based on the result, the process execution unit 2060 estimates that a trajectory of movement of the person 30 is a trajectory 60. Information indicating information of each camera 10 (such as the installation location) is written into any storage device accessible from the information processing apparatus 2000.

For example, by using the trajectory 60, it is possible to estimate a place where the person to be tracked has a high probability of passing among places that cannot be imaged by the monitoring camera. Then, it is possible to examine whether there is an abnormality (whether there is another left object) in a place that cannot be monitored by the surveillance camera, by having a security guard or the like examine the estimated location. According to this method, since it is possible to preferentially examine the place having a high probability that a person doing suspicious behavior has passed, facilities to be monitored can be efficiently monitored.

Further, the future behavior of the person to be tracked can be estimated from the trajectory 60 and the structure of the facility 50. For example, in the example of FIG. 9, it can be estimated that the person 30 moves toward an exit at an end of the trajectory 60 in a case where there are a plurality of entrances and exits in the facility 50. Thus, for example, it is possible to take measures such as closing that exit.

Here, the process execution unit 2060 may acquire video data 12 from all the cameras 10, or may acquire video data 12 from some of the cameras 10. In the latter case, for example, the process execution unit 2060 acquires video data 12 sequentially from a camera 10 closer to the camera 10 that detects that the target object is left, and estimates the trajectory of movement of the person to be tracked. Then, the process execution unit 2060 acquires the video data 12 only from the cameras 10 present on the estimated trajectory. In this way, in comparison with a case where the determination of the person to be tracked is performed by acquiring the video data 12 from all the cameras 10, there is an advantage that 1) the processing load of the information processing apparatus 2000 can be reduced, and 2) the time required to detect the person to be tracked can be shortened.

For example, in the case of FIG. 9, it is assumed that the process execution unit 2060 performs a process of estimating where the person to be tracked comes from before the object 20 being left. In this case, the process execution unit 2060 firstly determines that the person 30 has moved from the left direction in FIG. 9 on the basis of the movement of the person 30 in the video data 12 generated by the camera 10-4. Therefore, the process execution unit 2060 determines the camera 10-2 installed in the left direction of the camera 10-4 as the camera 10 for the video data 12 to be subsequently acquired. Similarly, the process execution unit 2060 determines that the person 30 has moved from an upper direction in FIG. 9 on the basis of the movement of the person 30 in the video data 12 generated by the camera 10-2. Therefore, the process execution unit 2060 determines the camera 10-1 installed in the upper direction of the camera 10-2 as the camera 10 for the video data 12 to be subsequently acquired.

On the other hand, in the case of FIG. 9, it is assumed that the process execution unit 2060 performs the process of estimating where the person to be tracked go to after the object 20 being left. In this case, the process execution unit 2060 firstly determines that the person 30 has moved toward the right direction in FIG. 9 on the basis of the movement of the person 30 in the video data 12 generated by the camera 10-4. Therefore, the process execution unit 2060 determines the camera 10-5 installed in the right direction of the camera 10-4 as the camera 10 for the video data 12 to be subsequently acquired. Similarly, the process execution unit 2060 determines that the person 30 has moved to a lower direction in FIG. 9 on the basis of the movement of the person 30 in the video data 12 generated by the camera 10-5. Therefore, the process execution unit 2060 determines the camera 10-7 installed in the lower direction of the camera 10-5 as the camera 10 for the video data 12 to be subsequently acquired.

Further, the process execution unit 2060 may estimate a time slot in which the person to be tracked is imaged by each camera 10 using a positional relation between the cameras 10, and may detect the person to be tracked using only the video frame 14 generated in the time slot. In this way, it is possible to further reduce the processing load of the information processing apparatus 2000 and the time required for the process of detecting the person 30.

For example, in the example of FIG. 9, first, the process execution unit 2060 detects the person 30 who is presumed to have left the object 20 on the basis of the video data 12 generated by the camera 10-4. In this case, as described above, the process execution unit 2060 estimates that the camera 10 for subsequently imaging the person 30 is the camera 10-5 on the basis of the movement of the person 30 in the video data 12. Furthermore, the process execution unit 2060 determines a time-point (the time-point when the person 30 starts to move from an imaging range of the camera 10-4 to an imaging range of the camera 10-5) when the person 30 is not included in the video data 12 generated by the camera 10-4, and estimates a time slot in which the person 30 enters an imaging range of the camera 10-5 on the basis of a determine time-point and a positional relation (a distance) between the camera 10-4 and the camera 10-5. In this case, a moving velocity of the person may also be estimated, and the estimated moving velocity may be reflected in an estimation of the time slot which is within the imaging range. Then, the process execution unit 2060 performs the process of detecting the person 30 on only the video frame 14 included in the estimated time slot among the video data 12 generated by the camera 10-5.

Hereinabove, although the embodiments of the present invention are described with reference to the accompanying drawings, the embodiments are examples of the present invention, and it is possible to use a combination of the above-described respective embodiments or various configurations other than the embodiments.

The invention claimed is:

1. An information processing apparatus comprising:
at least one memory storing instructions; and
at least one processor configured to execute the instructions to:
detect a stationary object from a video frame;
specify a first video frame including a target object detected as the stationary object; and
display the first video frame and a second video frame that includes the target object and a person associated with the target object and is generated chronologically before the first video frame,
wherein the second video frame indicates a state in which the person is present in a predetermined image area around the target object.

2. An information processing method executed by a computer, the information processing method comprising:
detecting a stationary object from a video frame;
specifying a first video frame including a target object detected as the stationary object; and
displaying the first video frame and a second video frame that includes the target object and a person associated with the target object and is generated chronologically before the first video frame,
wherein the second video frame indicates a state in which the person is present in a predetermined image area around the target object.

3. A non-transitory computer-readable medium storing a program for causing a computer to perform operations, the operations comprising:
detecting a stationary object from a video frame;
specifying a first video frame including a target object detected as the stationary object; and
displaying the first video frame and a second video frame that includes the target object and a person associated with the target object and is generated chronologically before the first video frame,
wherein the second video frame indicates a state in which the person is present in a predetermined image area around the target object.

* * * * *